(No Model.) 4 Sheets—Sheet 1.
C. PAYEN.
PROCESS OF MAKING POROUS CRYSTALLIZED METAL PLATES.
No. 440,273. Patented Nov. 11, 1890.
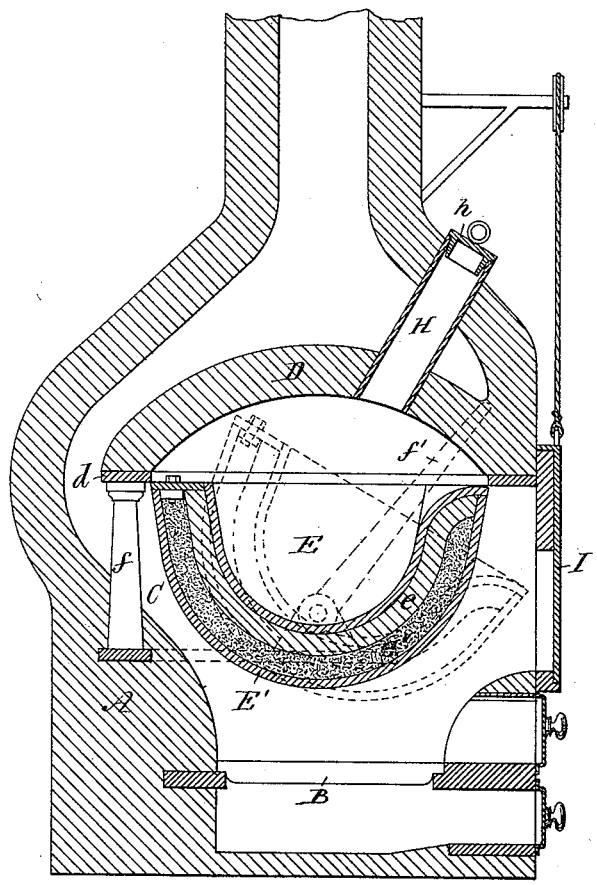
Fig. I.
WITNESSES:
INVENTOR:

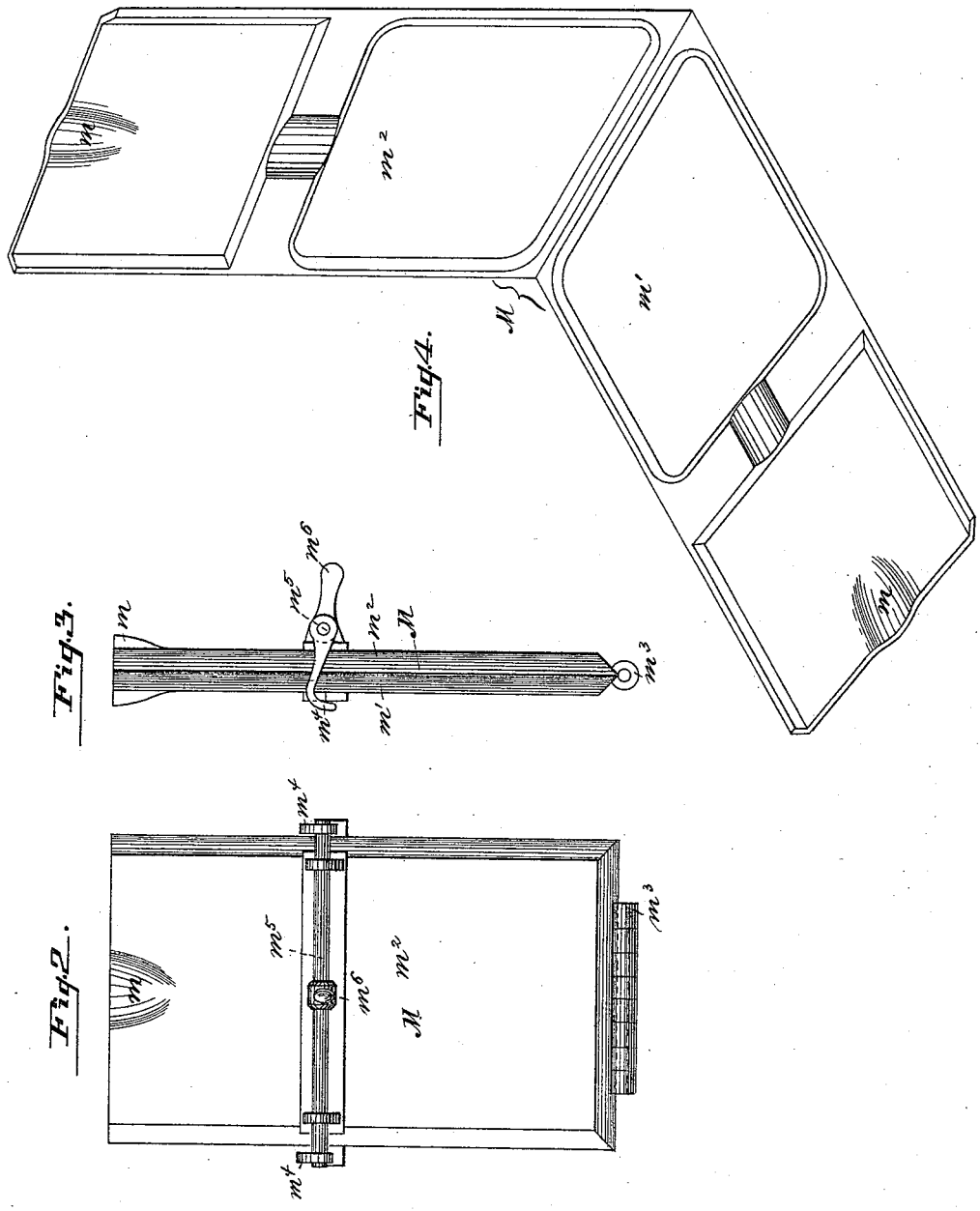

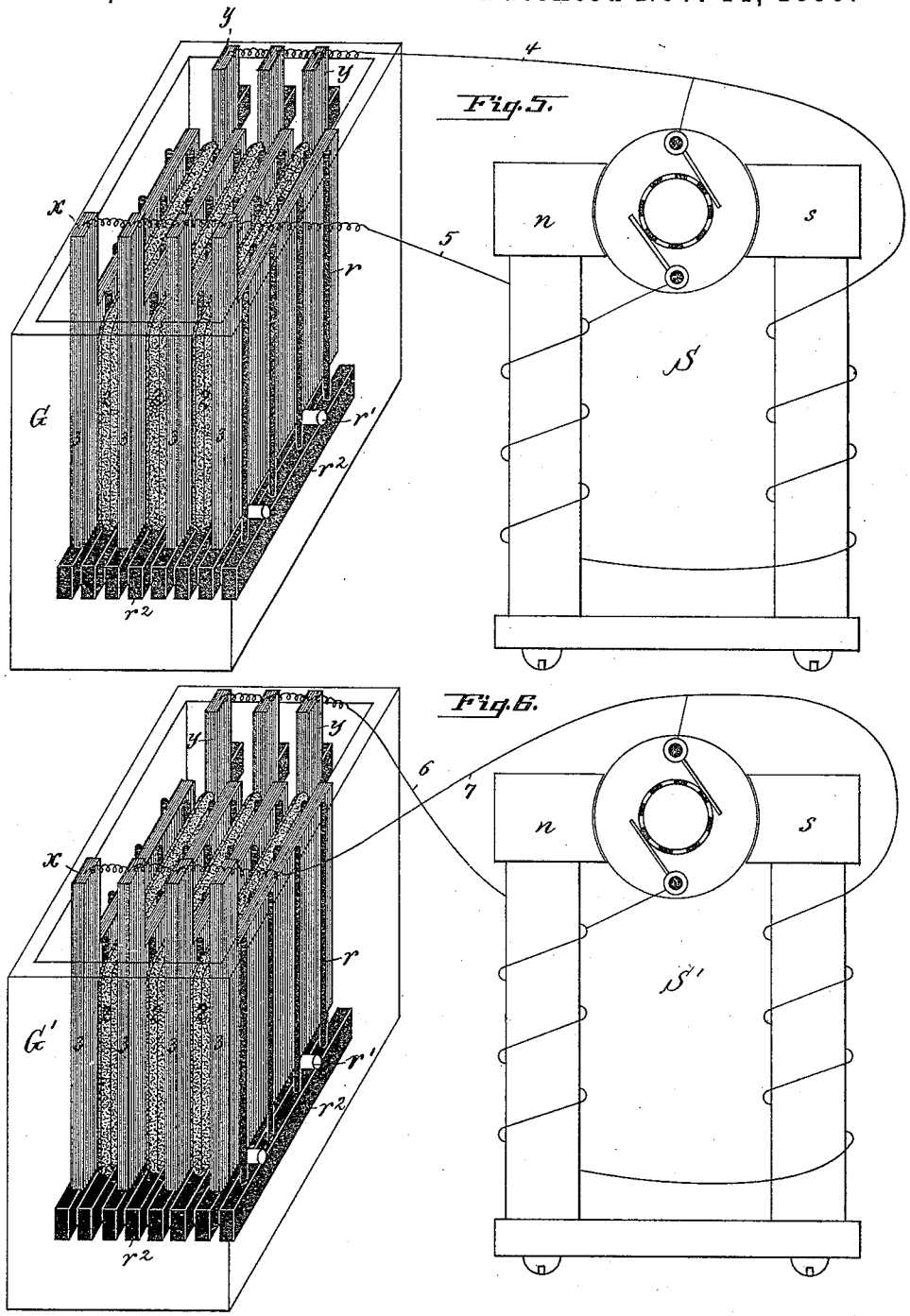

(No Model.)
4 Sheets—Sheet 4.
C. PAYEN.
PROCESS OF MAKING POROUS CRYSTALLIZED METAL PLATES.
No. 440,273. Patented Nov. 11, 1890.
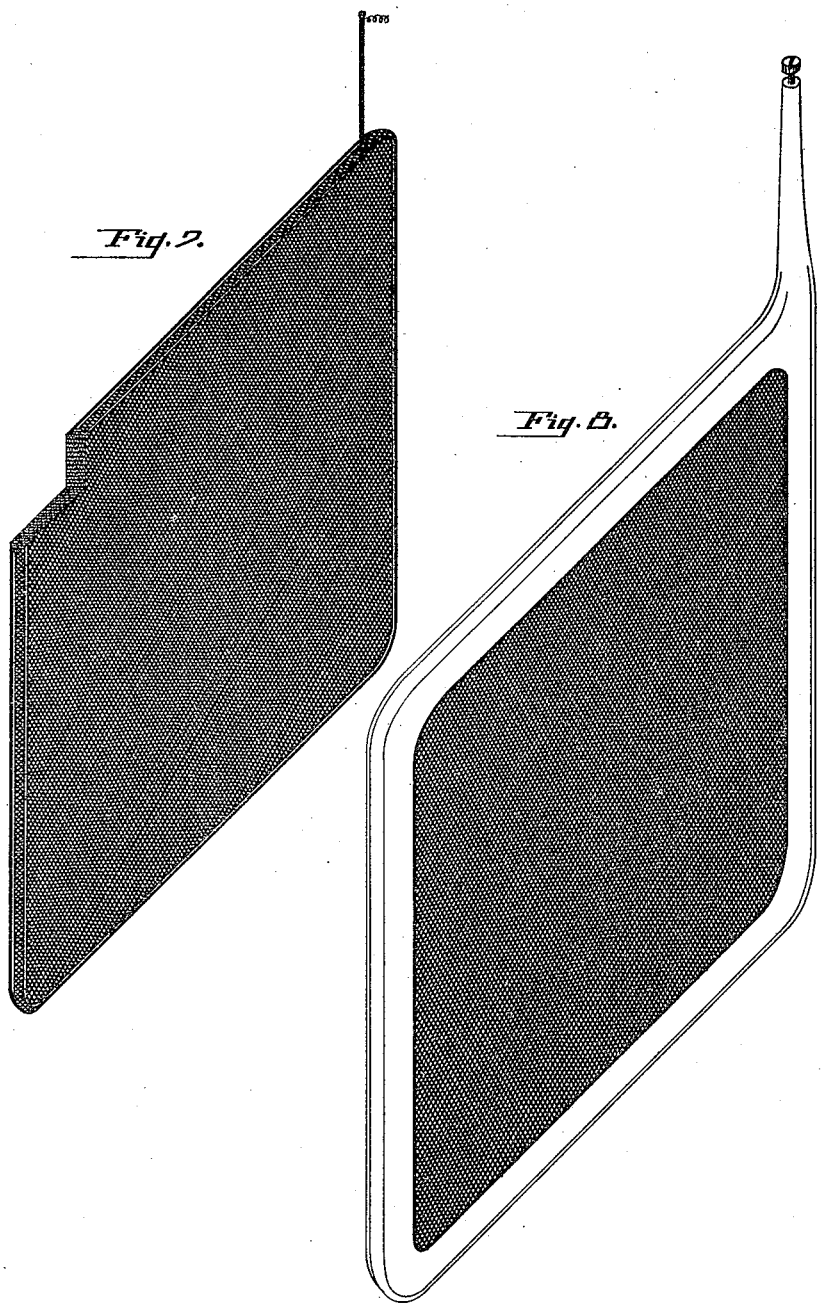
WITNESSES:
INVENTOR:

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF MAKING POROUS CRYSTALLIZED METAL PLATES.

SPECIFICATION forming part of Letters Patent No. 440,273, dated November 11, 1890.

Application filed June 16, 1888. Serial No. 277,360. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Process of Making Porous Crystallized Metal Plates, of which the following is a specification.

My present invention has relation to the manufacture of plates or elements of an electric battery.

The principal object of my invention is to provide a strong porous crystallized metal plate or element for a secondary battery.

My invention consists in fusing with a salt of a metal—as lead—a salt or salts containing a mineral acid—such as a sulphate, borate, or carbonate of the metal, or mixtures or combinations in variable proportions of two or more of them—then pouring the mass into a mold and allowing it to cool and crystallize therein, and then reducing to a metallic state, whereby the plate or element is brought to a porous crystallized condition for use.

In the accompanying drawings is illustrated an apparatus for the conduct of the method of making a plate or element embodying the features of my invention for an electric battery, and in which—

Figure 1 is a vertical central section through a furnace, showing the crucible pivotally supported therein. Fig. 2 is a top or plan view of a mold, wherein the mass is caused to assume a crystallized form. Fig. 3 is an end view thereof. Fig. 4 is a perspective view of the mold, showing the interior formation thereof. Figs. 5 and 6 are diagrammatic views of a double electrolysis, being one of the methods whereby plates may be reduced to a metallic state with the elimination of foreign matter from the plate or element. Figs. 7 and 8 are views in perspective of the crystallized porous metal plates with or without frames, one of said plates being broken away to show the form of the crystals therein and the cells between them, and showing, also, a wire composed of platinum or other material inserted directly into the plate and forming a conductor.

The method of producing a plate or element of my invention may be carried into effect in the following manner: To a charge composed of a salt or chloride of lead is added a salt containing a mineral acid—as sulphate, borate, or carbonate of lead—or two or more of such salts in proportions ranging from two to ten per cent., by weight, either before or during the fusion of the base salt in the crucible E of the furnace, and when sufficient fluidity has been secured without ebullition or bubbling of the same the fused mass is poured into, preferably, a two-part mold M, suitably clamped together through the mouth $m$ thereof, and after the mass has become cool or perfectly cold the two-part mold is unclamped and the cast structure removed therefrom into a mold for casting a suitable frame around the same, or if not to be framed directly into, respectively, vases G and G', containing a suitable electrolyte for effecting its or their reduction by electrolysis or chemical action, or both, in a manner hereinafter fully described, whereby the plate or plates so treated will be brought to a porous crystallized metallic state or condition for use as elements of of a secondary or storage battery.

The above-mentioned metallic salts containing a mineral acid are preferably added at the moment the point of fusion of the mass of the principal salt of lead has been reached, which in each case will depend upon the volatility of the added salt or salts, as well as upon the inherent tendency of such salt or salts to decompose under the influence of heat. Moreover, salts of the metals which readily decompose under the influence of heat may be used in conjunction with the salt or salts of a fusible nature, owing to the fact that by their decomposition they become fixed oxides and enter into composition with the elements of the mass of a fusible nature in the production of a porous crystallized metallic plate to form the element of an electric battery.

The interior surface of the mold M should be perfectly smooth, and in practice good results have been obtained by making the same of either brass or bronze and in two parts $m'$ and $m^2$, as shown in Fig. 4, with the parts hinged together at $m^3$ by means of catches $m^4$, mounted on the extremities of a shaft $m^5$, which is held in bearings $m^6$, formed with one of the parts thereof and operated by a lever $m^7$, as shown in Figs. 2 and 3. The catches $m^4$ engage with a strip $m^8$ on the opposite part of the mold by means of the lever $m^7$.

In the construction of the mold the two parts thereof may be of either equal or unequal thicknesses of metal. In the pouring of a fused mass into a mold having the two parts of equal thicknesses of metal, such mass will commence to cool from each side, and will meet at a median line. This meeting of the respective crystals in the structure will in a measure depend upon the rapidity with which the crystallization takes place in the cooling of the mass in the mold. When a mold is used having the two parts or sides of unequal thicknesses of metal, the fused mass will cool therein unequally, thereby causing the crystals to unite with each other beyond the median line of the plate or structure. In practice it is preferable to use a mold having the parts of equal thicknesses of metal, because the plate or structure cast therein is much stronger and more durable and effective in action as an element of a battery.

The plate or other form of structure, after having been cast in the mold and it has become cool therein, may be treated in the following manner to cause it to assume a metallic state or condition for use: A series of crystallized plates or other structures treated in the above-described manner is now placed in a vase G containing water and sulphuric acid in the proportion of ten per cent., (more or less.) The crystallized plates 2, immersed in the solution in the vase G, are alternated with plates of equal dimensions composed of lead, charcoal, or other material 3, each having a terminal $x$, all the crystallized plates 2 being connected through their terminals $y$ with a wire 4, while the lead, charcoal, or other plates 3 are connected through their terminals $x$ with a wire 5. The two systems of plates are insulated from each other by means of insulating-rods $r$ and from the vase G by insulators $r'$, mounted on the horizontal rods $r^2$ in the bottom of the vase G, as shown in Fig. 5, the system of crystallized plates being connected with the negative electrode $s$ of the dynamo S, while the system of lead or charcoal plates are connected with the positive electrode $n$ of the dynamo S. By the electrolytic action taking place the oxygen and elements of an electro-negative nature are separated from the system of crystallized plates and caused to attack the system of lead, charcoal, or other plates, while on the system of crystallized plates there will still remain such composites or materials of the metal as were combined with the charge or principal salt, but in a metallic state. The crystallized plates thus treated are then removed and immersed in another vase G' containing water and sulphuric acid in about the same proportions above mentioned. In this second receptacle G' the crystallized plates are again alternated with others of ordinary lead, charcoal, or other material plates, through the terminals $x$, while the positive electrode $n$ is connected with the system of crystallized plates through the terminals $y$, as shown in Fig. 6. By the second electrolytic action which takes place the composites or materials of the metals in a metallic state will be deposited on the lead, charcoal, or other plates, the oxygen attacking the crystallized-metal plates.

Another mode of reducing the crystallized plates to a metallic state by chemical action may be resorted to and carried out in the following manner: A series of crystallized plates is arranged in contact with a series of metallic zinc plates of equal dimension in a solution composed of common salt or, preferably, of sal-ammoniac and water in a vase for from twelve to fifteen hours, (more or less.) The effect produced by the chemical action taking place upon the crystallized plates will be to eliminate the gases contained in the crystallized plates, and also to cause the foreign elements contained in the crystallized plates to combine with the solution of the vase, thereby leaving the crystallized plates in a porous crystallized metallic state. The porous crystallized metal plates treated in either of the above ways by electrolytic or chemical action, or both, may then be removed from the vase and thoroughly washed and dried by a gentle heat, whereby they will be brought to a pure porous crystallized metallic state, as illustrated in Figs. 7 and 8, for use as the plates or elements of a secondary or storage battery.

A plate or element of a battery may be produced in the manner above described by subjecting chloride of lead to fusion in the crucible E, and adding thereto from two to ten per cent., by weight, (more or less,) of borate of lead and then casting the mass in the mold M, and reducing to a metallic state by electrolytic or chemical action, or both, or a plate may be formed of a salt of lead having a mixture of carbonate of lead added thereto before, during, or at the moment the point of fusion of the mass is reached, that will be adapted for use as an element of a battery. It should be borne in mind that the main purpose or object of adding such salt or salts as contain a mineral acid or acids to the base or principal salt or salts of the mass is to secure a greater degree of porosity in the structure for use as an element of a battery.

Having thus described the nature and objects of my invention, what I claim as new, and desire to secure by Letters Patent, is—

1. The herein-described method of making a porous battery plate or element, which consists in subjecting a metallic salt or salts containing a mineral acid or acids to fusion with a salt of lead, then casting the mass and allowing it to cool, and then reducing the cast plate or other structure to a metallic state, substantially as and for the purposes set forth.

2. The herein-described method of making a porous battery-plate or element, which consists in subjecting a metallic salt or salts containing an acid or acids to fusion with a lead salt, then casting the mass, and then reducing electrolytically and chemically to a metallic state, substantially as and for the purposes set forth.

In witness whereof I have hereunto set my signature in the presence of two subscribing witnesses.

CLÉMENT PAYEN.

Witnesses:
GEO. W. REED,
THOMAS M. SMITH.